Dec. 13, 1966  A. F. COMMEYRAS  3,291,361
CONTAINER RIM FORMATION
Filed Jan. 7, 1965  2 Sheets-Sheet 1

INVENTOR
ANDRÉ F. COMMEYRAS
BY Wolf, Greenfield & Hieken
ATTORNEYS

Dec. 13, 1966   A. F. COMMEYRAS   3,291,361
CONTAINER RIM FORMATION
Filed Jan. 7, 1965   2 Sheets-Sheet 2
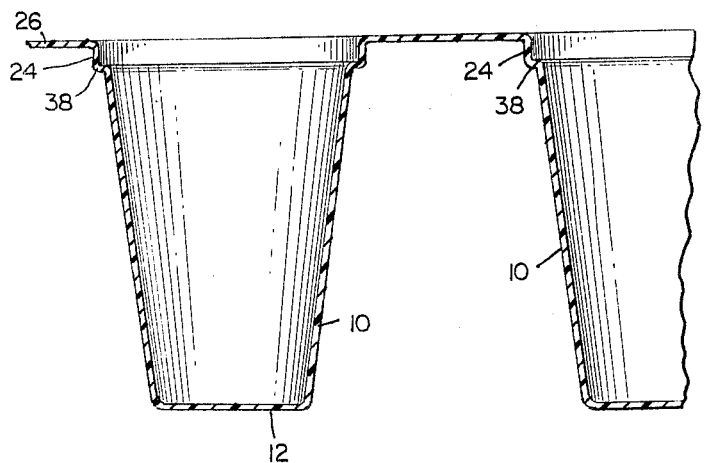
FIG. 6
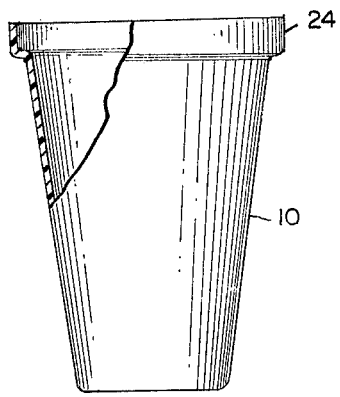
FIG. 7
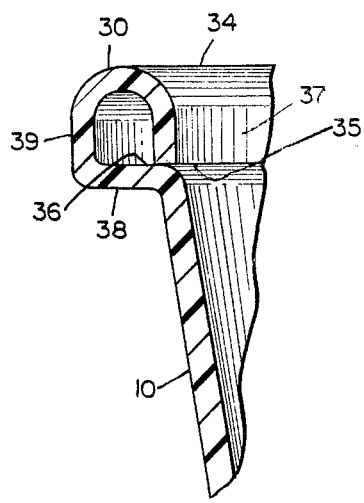
FIG. 9
FIG. 8
INVENTOR:
ANDRÉ F. COMMEYRAS
BY, Wolf, Greenfield & Hicken
ATTORNEYS

United States Patent Office 3,291,361
Patented Dec. 13, 1966

3,291,361
CONTAINER RIM FORMATION
Andre F. Commeyras, Concord, Mass., assignor to Sweetheart Plastics, Inc., Guildware Park, Wilmington, Mass., a corporation of Maryland
Filed Jan. 7, 1965, Ser. No. 423,985
12 Claims. (Cl. 229—1.5)

This invention relates to disposable plastic containers and more particularly comprises new rim formations on such containers.

The rim formation on containers used in vending and dispensing machines is particularly critical. Preferably the bead which defines the rim has a flat substantially horizontal lower wall which extends inwardly to the side wall proper of the container without defining a gap between the side wall and the bead. That configuration provides a firm wall against which the conveying mechanism may push to carry out the sequential delivery of the containers in the machine. Furthermore, if the horizontal wall abuts against the side to close the bead, there is no exposed edge which may catch on the mechanism, and there is no place for dirt or other extraneous matter to collect and contaminate the container. For dependable operation of the conveying mechanism it is also important that the container diameter measured at the bead be within certain narrow limits. If the bead diameter does not lie within the prescribed limits, the containers will either jam the mechanism or be delivered in pairs rather than one at a time in the machine.

It is an object of the present invention to provide a container rim having a substantially horizontal bottom wall which terminates in direct contact with the outer surface of the main container side wall.

Another object of the invention is to provide a method of forming a rim of a container with a horizontal bottom wall joined to the outer surface of the side wall of the container.

Yet another object of this invention is to provide a method of forming a rolled rim on a container which provides substantial control over rim diameter.

To accomplish these and other objects this invention includes among its features a thin walled one-piece plastic container having a side wall provided with a first outwardly extending step adjacent to the top of that wall and a second substantially horizontal outwardly extending step provided in the side wall and spaced between the top of the wall and the first step. A rolled rim extends through an arc of approximately 270° from the second step and extends over the top of the second step and down adjacent to the inside of the side wall between the first and second steps. In accordance with the method of this invention the container is formed with the two steps in its side wall and is trimmed to leave a skirt above the top step. The collar or skirt is heated and turned inwardly and downwardly to form the rim, and it is heat set against the inner surface of the side wall.

In an alternate embodiment of the invention, a thin walled one-piece plastic container is provided with an outwardly extending step adjacent the top of that wall. A rolled over rim extends through an arc of at least 180° from the step inwardly of the container and has an end edge adjacent an upper surface provided by the step on the inner surface of the side wall. In accordance with the method of this invention, the container of this embodiment is formed with the outwardly extending step and is trimmed to leave a skirt or collar above the step. The skirt is heated and turned inwardly and downwardly to form the rim.

These and other objects and features of this invention, along with its incident advantages, will be better understood and appreciated from the following detailed description of one embodiment thereof, selected for purposes of illustration and shown in the accompanying drawing, in which:

FIGS. 6–8 are cross-sectional views showing the successive steps of an alternate embodiment of the invention to form a container having a rolled rim of the configuration of FIG. 9; and FIG. 9 is an enlarged fragmentary view of the rim of the alternate embodiment of the invention.

Figure 4:
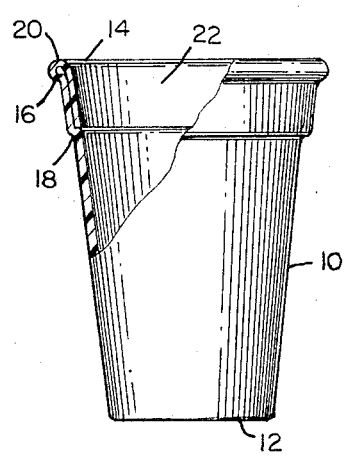

In FIG. 4 a thin walled one-piece plastic cup is shown having an upwardly flared side wall 10, a bottom wall 12 and a rolled rim 14. The rim 14 includes a flat horizontal lower wall 16 integral with the side wall 10 and avoids the formation of any gap between the inner end of the lower wall 16 and the container side wall. The lower wall 16 of the rim 14 is one of two steps adjacent the top of the side wall. The width of the second step 18 preferably is substantially equal to or greater than the thickness of the stock from which the cup is formed. The width of the step 16 must be vary carefully controlled during the forming of the cup to provide a diameter for the rim 14 of a very precise size. The rim 14 includes in addition to the lower wall 16, an arcuate portion 20 which extends from the outer end of the lower wall 16 over that wall and merges smoothly into a downwardly extending flange 22 which lies against the inner surface of the side wall 10 between the steps 16 and 18.

Figure 1:
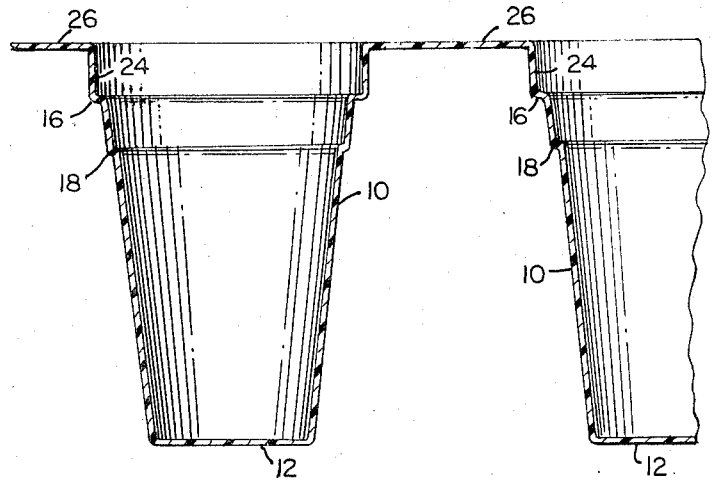
FIGS. 1–4 are cross-sectional views showing the successive steps of the invention to form a container having a rolled rim of the configuration of FIG. 4.
Figure 2:
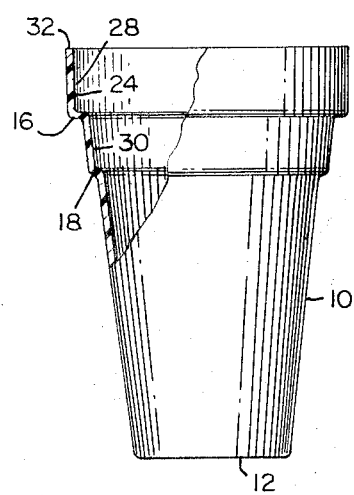
Figure 3:
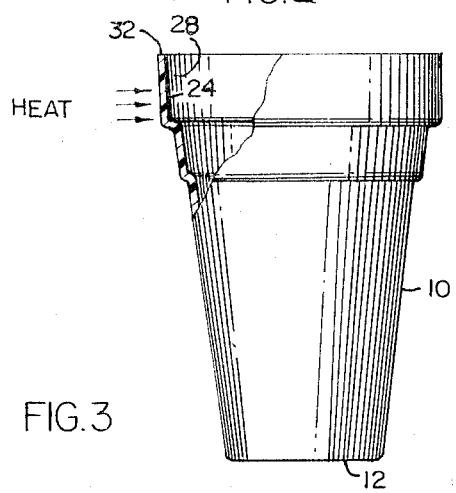

In FIGS. 1–3, the successive steps employed to form the cup shown in FIG. 4 are illustrated. In FIG. 1 a multicup blank is shown with each cup composed of the side wall 10, bottom wall 12, steps 16 and 18, a skirt 24 which extends upwardly from the outer end of the step 16 and an outwardly extending flange 26 which may comprise the web of a sheet of plastic material in which the plurality of cup blanks are formed. During the forming of the cup blank the diameter of the steps 16 should be very carefully controlled for the maximum diameter of the rim 14 subsequently formed in the blank is determined by the maximum diameter at the step 16. When the blank is vacuum or pressure formed, or formed in another way about a male or female die, the dimensions may be very closely controlled.

After the cup blank is formed as shown in FIG. 1, the flange or web 26 is trimmed to provide the skirt 24 with a particular height, which may be determined by the size of the rim 14 and the length of the side wall 10 between the steps 16 and 18. Either during or after the flange 26 is trimmed, the skirt 24 is preferably subjected to the localized application of heat to elevate the temperature of the stock at the skirt 24 to the formable range. The application of heat to the skirt 24 may be carried out by any one of a number of ways, but preferably the heat is applied by contact heaters that actually engage the inner and/or outer surface of the skirt 24 to the exclusion of the side wall 10. Contact heating of the skirt provides maximum control over the heating operation and introduces heat to the skirt most effectively to the exclusion of the remaining portion of the container. That is, while the skirt 24 is heated to a formable temperature the rest of the side wall remains relatively cool so as not to deform when any forces are applied to it.

Immediately after the heat is applied to the skirt 24 as suggested in FIG. 3, the skirt is rolled inwardly and downwardly to form a radius over the lower wall 16 of the rim so that the inner surface 28 of the skirt lies flush against the inner surface 30 of the side wall between the steps 16 and 18. The upper edge 32 of the skirt 24 is in substantial face-to-face relationship with the upper inner surface of the step 18. During this operation the surfaces 28 and 30 may be sealed together. After the skirt 24 is turned inwardly and downwardly to the position shown in FIG. 4 so as to define the flange 22, the stock is allowed to cool so that the plastic sets with the skirt in the position shown in FIG. 4. There after, the forming tool is removed and the rim 14 is completed.

The rim 14 constructed in accordance with the method of this invention has many advantages. The lower wall 16 of the rim provides a flat surface against which the conveying mechanism may push in a vending or dispensing machine to carry the container to the desired location. The outer diameter, i.e., the maximum diameter of the rim 14, is preset by the mold which forms the step 16 in the container blank, and that diameter should not change during the subsequent steps of forming the rim. Consequently, very precisely uniformity may be obtained as a result of the control exercised over that diameter. Because the lower wall 16 is integral with the side wall 10 of the container, no gap is formed between the inner end of the lower wall and the side wall, in which dirt may collect or conveying equipment catch to make the cup unsanitary and jam the conveying equipment.

In an alternate embodiment of this invention, as shown in FIGURES 6-9, a thin-walled, one-piece plastic cup generally similar to the cup of FIGURE 4 is shown having an upwardly flared side wall 10, a bottom wall 12 and a rolled rim 34. The rim 34 includes a flat, horizontal lower wall or step 38 integral with the side wall 10 and avoids the formation of any gap between the inner end of the step 38 and the container side wall. The step 38 of the rim 34 is the only step employed in this embodiment of the invention.

The width of the step 38 is at least equal to the thickness of the stock from which the container is formed. The width of the step 38 may be very carefully controlled during the forming of the cup to provide a diameter for the rim 34 of a very precise size. The rim 34 includes, in addition to the step 38, an arcuate portion 30 which extends from the outer end of the step wall 38 over that wall inwardly toward the axis of the cup, and has an end edge 35 which lies against the inner surface 36 of the step wall 38, providing a rim portion or surface 37 which is substantially coextensive with the inner surface of the side wall 10. Preferably portion 37 is spaced slightly from an outer portion 39 of the rim 34 and end edge 35 can be sealed to the upper inner surface of the step wall 36.

In some cases no seal is used between the end edge 35 and the upper inner surface of the step wall 38 with the natural mechanical strength of the plastic holding the rim in place. It is also possible to flatten portion 37 against portion 39, although this is not preferred due to the extremely small width of the resultant rim. It should be understood that it is preferred to have the flat, horizontally extending step wall 38 with a width sufficient to provide a relatively large arcuate portion 30 for comfort to the mouth of a user. In normal cases the width of wall 38 is approximately 3 or 4 times the thickness of the plastic stock.

In FIGS. 6-8, the successive steps employed to form the alternate embodiment of the cup partially illustrated in FIGURE 9 are shown. In FIGURE 6 a multi-cup blank is shown with each cup composed of the side walls 10, bottom wall 12, step wall 38, skirt 24 which extends upwardly from the outer end of the step wall 38 substantially parallel to the axis of the cup, and an outwardly extending flange 26 which may comprise the web of a sheet of plastic material in which the plurality of cup blanks are formed. During the forming of the cup blanks, the diameter of the step wall 38 should be very carefully controlled for the maximum diameter of the rim 34 subsequently formed in the blank is determined by the maximum diameter at the wall 38. When the blank is vacuum or pressure formed, or formed in any other way about a male or female guide, the dimensions can be very closely controlled.

After the cup blanks are formed as shown in FIGURE 6, web 26 is trimmed to provide the skirt 24 as shown in FIGURE 7 with a particular desired height which can be determined by the height and size of the rim 34 desired. Either during or after the flange 26 is trimmed, the skirt 24 is preferably subjected to the localized application of heat to elevate the temperature of the stock at the skirt 24 to the formable range. The application of heat to the skirt 24 may be carried out by any one of a number of ways, but preferably the heat is applied by contact heaters that actually engage the inner and/or outer surface of the skirt 24 to the exclusion of the side wall 10. In some cases only the upper portion of the skirt 24 in which the arcuate portion 30 is reformed may be heated, as illustrated in FIGURE 8. Contact heating of the skirt provides maximum control over the heating operation and introduces heat to the skirt 24 most effectively to the exclusion of the remaining portions of the container. That is, while the portion or all skirt 24 which is desired to be heated to a formable temperature is heated, the rest of the side wall remains relatively cool so as not to deform when any forces are applied to it.

Immediately after the heat is applied to the skirt 24, as diagrammatically suggested in FIGURE 8, the skirt is rolled inwardly and downwardly to form a radius so that the end edge 35 of the skirt lies flush against the inner upper surface of the wall 38 in face to face relationship, and preferably substantially coextensive with inner surface of the side wall 10. During this operation, the inner edge 35 may be heat-sealed to the upper inner surface 36 of wall 38 or adhesives or heat sealing can be later used to form a bond. In some cases no bond is necessary.

After the skirt 24 is turned inwardly and downwardly to the position shown in FIGURE 9 so as to define the flange portion 37 spaced from an outer rim portion 39, the stock is allowed to cool so that the plastic sets with the skirt in the position shown in FIGURE 9. Thereafter the forming tool can be removed and the rim 34 is completed.

Figure 5:
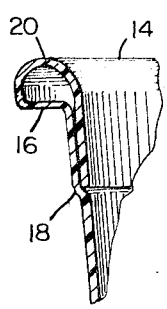
FIG. 5 is an enlarged fragmentary view of the rim.

The alternate embodiment of the rim 34 constructed in accordance with the method described above has many advantages similar to the advantages obtained with the embodiment of the cup shown in FIGURES 4 and 5. The lower wall 38 of the rim provides a flat surface as in the embodiment of FIGURES 4 and 5. The outer diameter of the cup is also preset by the mold which forms step wall 38 in the blank, and that diameter should not change during subsequent steps in forming the rim. In addition rim 34 uses a relatively simple blank with an extremely easily carried out rolling over or forming step.

From the foregoing description those skilled in the art will appreciate that several modifications may be made of this invention without departing from its spirit. Therefore, it is not intended to limit the breadth of this invention to the specific embodiment illustrated and described. Rather, it is intended that the breadth of this invention be determined by the appended claims and their equivalents.

What is claimed is:

1. A thin walled one-piece plastic container comprising a bottom wall and an outwardly flared side wall,
   a first outwardly extending step in the side wall adjacent the top of that wall,
   a second outwardly extending substantially horizontal step provided in the side wall and spaced from and disposed above the first step,
   and a rolled rim extending through an arc of approximately 270° from the end of the second step and extending over the top of the second step and down against the inside of the side wall and terminating immediately above the first step.

2. A container as defined in claim 1 further characterized by
said first step being approximately equal in width to the thickness of the side wall.

3. A container as defined in claim 1 further characterized by
the end of the rim being sealed to the inner surface of the side wall.

4. A container comprising
a bottom wall and a side wall,
an outwardly extending step provided in the side wall adjacent the top,
and a rolled rim extending through an arc of 270° from the outer edge of the step and extending over the step and inwardly and downwardly against the inner surface of the side wall below the step, the end of the rim being sealed to the inner surface of the wall.

5. A container with a rolled rim comprising
a generally cylindrical side wall,
a step provided in the side wall adjacent the end of the wall and extending generally perpendicular and away from the axis of the wall,
and an inwardly rolled rim provided in the wall between the end and the step, said rim turning away from and then over the step.

6. A container in accordance with claim 5 wherein a second step is provided in said wall below said first mentioned step,
said rim carrying an integral flange extending beyond said first step towards said second step.

7. A container in accordance with claim 6 wherein said flange lies against the inside of said side wall and terminates immediately above said second step.

8. A container in accordance with claim 5 wherein said rim ends at said step.

9. A container in accordance with claim 5 and further consisting of a one-piece plastic sheet material.

10. A container in accordance with claim 6 and further consisting of a one-piece plastic sheet material.

11. A contained in accordance with claim 5 and further characterized by said step having a width greater than the thickness of said side wall,
said container consisting of a one-piece plastic sheet material.

12. A container in accordance with claim 9 wherein said step defines the largest diameter of said side wall.

References Cited by the Examiner
UNITED STATES PATENTS

| | | | |
|---|---|---|---|
| 885,887 | 4/1908 | Taylor | 229—5.5 |
| 1,706,007 | 3/1929 | Van Alstyne et al. | 220—60 X |
| 1,884,691 | 10/1932 | Holloway | 220—60 X |
| 2,005,245 | 6/1935 | Stover | 229—5.5 X |
| 2,099,056 | 11/1937 | Ferngren | 229—5.5 |
| 2,316,150 | 4/1943 | Amberg | 229—1.5 |
| 2,974,825 | 3/1961 | Ross | 206—45.34 X |
| 2,979,224 | 4/1961 | Henchert | 220—82 X |
| 3,190,530 | 6/1965 | Edwards | 229—1.5 |

JOSEPH R. LECLAIR, *Primary Examiner.*

D. T. MOORHEAD, *Assistant Examiner.*